US008798667B2

(12) United States Patent
Iwamura et al.

(10) Patent No.: US 8,798,667 B2
(45) Date of Patent: Aug. 5, 2014

(54) MOBILE COMMUNICATION METHOD, MOBILE STATION AND RADIO BASE STATION

(75) Inventors: Mikio Iwamura, Yokohama (JP); Wuri Andarmawanti Hapsari, Yokosuka (JP); Shogo Yabuki, Yokosuka (JP); Alf Zugenmaier, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/937,048

(22) PCT Filed: Jun. 23, 2009

(86) PCT No.: PCT/JP2009/061383
§ 371 (c)(1),
(2), (4) Date: Dec. 17, 2010

(87) PCT Pub. No.: WO2009/157432
PCT Pub. Date: Dec. 30, 2009

(65) Prior Publication Data
US 2011/0092236 A1     Apr. 21, 2011

(30) Foreign Application Priority Data

Jun. 23, 2008   (JP) ................................. 2008-163898

(51) Int. Cl.
*H04B 7/00*      (2006.01)
(52) U.S. Cl.
USPC ............ 455/525; 455/436; 455/437; 370/331
(58) Field of Classification Search
USPC ........................... 455/436–444, 525; 370/331
See application file for complete search history.

(56) References Cited

U.S. PATENT DOCUMENTS

| 6,587,680 | B1 | 7/2003 | Ala-Laurila et al. |
| 7,366,496 | B2 * | 4/2008 | Vialen et al. .................. 455/410 |

(Continued)

FOREIGN PATENT DOCUMENTS

| JP | 2007-506378 A | 3/2007 |
| WO | 2005/029785 A1 | 3/2005 |

OTHER PUBLICATIONS

Ericsson: "UE identification in RRC connection re-establishment procedure", 3GPP Draft; R2-080755 (UE ID in RRC Re-Establishment), 3rd Generation Partnership Project (3GPP), Mobile Competence Centre; 650, Route Des Lucioles; F-06921 Sophia-Antipolis Cedex; France, vol. RAN WG2, no. Sorrento, Italy; Feb. 5, 2008, XP050138581, [retrieved on Feb. 5, 2008] pp. 1-4.

(Continued)

*Primary Examiner* — Raymond Dean
(74) *Attorney, Agent, or Firm* — Osha Liang LLP

(57) ABSTRACT

A mobile communication method according to the present invention including the steps of: generating, at a mobile station (UE), first verification information by use of a first key, a first parameter and an algorithm for "Integrity Protection"; generating, at the mobile station (UE), second verification information by extracting predetermined bits of the first verification information; and performing, at the mobile station (UE), cell selection processing, and transmitting, from the mobile station to a radio base station that manages the selected cell, an RRC-PDU for RRC connection re-establishment request through a common control channel, upon detection of a radio link failure in an RRC connection, the second verification information being set in the RRC-PDU for RRC connection re-establishment request.

5 Claims, 4 Drawing Sheets

(56) References Cited

U.S. PATENT DOCUMENTS

| | | | |
|---|---|---|---|
| 2004/0162072 A1* | 8/2004 | Sigle et al. | 455/436 |
| 2008/0171569 A1* | 7/2008 | Pralle et al. | 455/525 |
| 2009/0163211 A1* | 6/2009 | Kitazoe et al. | 455/436 |
| 2009/0232089 A1* | 9/2009 | Lott | 370/331 |

OTHER PUBLICATIONS

Alcatel-Lucent: 3GPP Draft; R2-081699, 3rd Generation Partnership Project (3GPP), Mobile Competence Centre; 650, Route Des Lucioles; F-06921 Sophia-Antipolis Cedex; France, vol. RAN WG2, no. Shenzhen, China; Mar. 24, 2008, XP050139413, [retrieved on Mar. 24, 2008] pp. 1-3.

NTT DoCoMo et al: "Short MAC-I for re-establishment request", 3GPP Draft; R2-083457 Re-Establishment Short MAC-I, 3rd Generation Partnership Project (3GPP), Mobile Competence Centre; 650, Route Des Lucioles; F-06921 Sophia-Antipolis Cedex; France, vol. RAN WG2, no. Warsaw, Poland; Jun. 24, 2008, XP050140844, [retrieved on Jun. 24, 2008] pp. 1-6.

NTT DoCoMo et al: "Short MAC-I for re-establishment request", 3GPP Draft; R2-084421 Re-Establishment Short MAC-I, 3rd Generation Partnership Project (3GPP), Mobile Competence Centre; 650, Route Des Lucioles; F-06921 Sophia Antipolis Cedex; France, no. Jeju; Aug. 12, 2008, XP050319488, [retrieved on Aug. 12, 2008] pp. 1-8.

Extended European Search Report issued in European Application No. 09770142.9, mailed on Mar. 3, 2011, 12 pages.

International Search Report w/translation from PCT/JP2009/061383 dated Sep. 1, 2009 (3 pages).

Written Opinion from PCT/JP2009/061383 dated Sep. 1, 2009 (3 pages).

3GPP TS 36.331 V8.3.0; "3rd Generation Partnership Project; Technical Specification Group Radio Access Network; Evolved Universal Terrestrial Radio Access (E-UTRA) Radio Resource Control (RRC); Protocol specification"; Sep. 2008 (178 pages).

3GPP TS 36.300 V8.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description"; Mar. 2008 (126 pages).

3GPP TS 36.331 V8.2.0; "3rd Generation Partnership Project; Technical Specification Group Radio Access Network; Evolved Universal Terrestrial Radio Access (E-UTRA) Radio Resource Control (RRC); Protocol specification"; May 2008 (151 pages).

Office Action for European Application No. 09770142.9 mailed Aug. 31, 2011 (6 pages).

3GPP TSG CT WG1 Meeting 54; C1-082409; Pseudo-CR on Definition of the Service Request Message, Zagreb, Croatia; Jun. 23-27, 2008 (10 pages).

Office Action for Canadian Application No. 2,720,914 mailed Aug. 30, 2011 (5 pages).

Office Action for Indonesian Application No. W00 2010 03910 dated Sep. 21, 2012, with English translation thereof (5 pages).

Office Action for Canadian Application No. 2,720,914 dated Sep. 26, 2012 (4 pages).

Office Action for European Application No. 09 770 142.9 dated Feb. 20, 2012 (5 pages).

Office Action for Russian Application No. 2010141488/07 dated Jun. 15, 2012, with English translation thereof (8 pages).

* cited by examiner

MOBILE COMMUNICATION METHOD, MOBILE STATION AND RADIO BASE STATION

CROSS-REFERENCE TO RELATED APPLICATIONS

This is a national stage application of PCT/JP2009/061383, which claims priority to JP2008-163898.

TECHNICAL FIELD

The present invention relates to a mobile communication method, a mobile station and a radio base station.

BACKGROUND ART

In the LTE (Long Term Evolution) type mobile communication system specified by the 3GPP, a mobile station UE is configured to perform a connection re-establishment procedure, when detecting a radio link failure (RLF) in an Radio Resource Control (RRC) connection. Specifically, in the connection re-establishment procedure, the mobile station is configured to perform cell selection processing and to transmit an "RRC Connection Re-establishment Request" through a common control channel (CCCH) to the selected cell.

Here, the mobile station UE is configured to select, in the cell selection processing, a cell which meets a certain propagation level and to which the mobile station UE has an access right.

SUMMARY OF THE INVENTION

Problems to be Solved by the Present Invention

In the connection re-establishment procedure, a radio base station eNB that manages the selected cell is configured to verify an "RRC Connection Re-establishment Request" on the basis of "second verification information (short MAC-I)" contained in the "RRC Connection Re-establishment Request" to avoid the following problems.

The radio base station eNB cannot distinguish "RRC Connection Re-establishment Requests" from each other, when the mobile stations UE that have detected an RLF in different cells transmit the "RRC Connection Re-establishment Requests" containing the same C-RNTI (Cell-Radio Network Temporary Identifier) and the same PCI (Physical Cell ID) to the selected cell.

The radio base station eNB cannot distinguish an "RRC Connection Re-establishment Request" from others, when a mobile station UE of a malicious user transmits the "RRC Connection Re-establishment Request" containing a C-RNTI and a PCI which are randomly set.

The "short MAC-I" can be used to verify the credibility of the "RRC Connection Re-establishment Request". In other words, the "short MAC-I" can serve as a checksum for performing a tampering check of the "RRC Connection Re-establishment Request".

In the LTE type mobile communication system, a tampering check of an RRC message on a dedicated control channel (DCCH) is provided by a PDCP layer function. Specifically, the system is configured to generate a checksum (MAC-I) for the RRC message in a PDCP layer, and to transmit the checksum attached to the PDCP header.

Meanwhile, the LTE type mobile communication system is configured to transmit an "RRC Connection Re-establishment Request" through the common control channel (CCCH).

Furthermore, the LTE type mobile communication system has no PDCP layer function for the common control channel (CCCH).

In consideration of the above circumstances, it is apparent that the "short MAC-I" to be contained in the "RRC Connection Re-establishment Request" cannot be generated under the current LTE specifications.

The present invention was made in consideration of the foregoing problem. It is an object of the present invention to provide a mobile communication method, a mobile station and a radio base station which are capable of generating "short MAC-I" to be contained in an "RRC Connection Re-establishment Request".

Means for Solving the Problems

A first aspect of the present invention is summarized as a mobile communication method including the steps of: generating, at a mobile station, first verification information by use of a first key, a first parameter and an algorithm for "Integrity Protection"; generating, at the mobile station, second verification information by extracting predetermined bits of the first verification information; and performing, at the mobile station, cell selection processing, and transmitting, from the mobile station to a radio base station that manages the selected cell, an RRC-PDU for RRC connection re-establishment request through a common control channel, upon detection of a radio link failure in an RRC connection, the second verification information being set in the RRC-PDU for RRC connection re-establishment request.

In the first aspect, the first parameter can be "COUNT", "bearer ID" and "direction (DL/UL)"; and a physical cell ID and a C-RNTI can be set in the RRC-PDU for RRC connection re-establishment request.

A second aspect of the present invention is summarized as a mobile communication method including the steps of: generating, at a radio base station, first verification information using a first key, a first parameter and an algorithm for "Integrity Protection"; generating, at the radio base station, second verification information by extracting predetermined bits of the first verification information; performing, at the mobile station, cell selection processing, and transmitting, from the mobile station to the radio base station that manages the selected cell, an RRC-PDU for RRC connection re-establishment request through a common control channel, upon detection of a radio link failure in an RRC connection, the second verification information being set in the RRC-PDU for RRC connection re-establishment request; and verifying, at the radio base station, the RRC-PDU for RRC connection re-establishment request received from the mobile station by use of the second verification information.

In the second aspect, the first parameter can be "COUNT", "bearer ID" and "direction (DL/UL)".

A third aspect of the present invention is summarized as a mobile station including: a first verification information generator unit configured to generate first verification information by use of a first key, a first parameter and an algorithm for "Integrity Protection"; a second verification information generator unit configured to generate second verification information by extracting predetermined bits of the first verification information; and a transmitter unit configured to, upon detection of a radio link failure in an RRC connection, perform cell selection processing and transmit an RRC-PDU for RRC connection re-establishment request through a common control channel to a radio base station that manages the selected cell, the second verification information being set in the RRC-PDU for RRC connection re-establishment request.

In the third aspect, the first parameter can be "COUNT", "bearer ID" and "direction (DL/UL)"; and a physical cell ID and a C-RNTI can be set in the RRC-PDU for RRC connection re-establishment request.

In the third aspect, the transmitter unit can be configured to set, as the physical cell ID, a physical cell ID of a cell in which a radio link failure has occurred during the RRC connection, and to set, as the C-RNTI, a C-RNTI used by the mobile station UE in the cell in which the radio link failure has occurred.

In the third aspect, the first verification information generator unit can be configured to generate the first verification information for a PDU in which a physical cell ID of a cell in which a radio link failure has occurred during the RRC connection, a C-RNTI used by the mobile station UE in the cell in which the radio link failure has occurred, and a cell ID of the selected cell are set.

A fourth aspect of the present invention is summarized as a radio base station including: a first verification information generator unit configured to generate first verification information by use of a first key, a first parameter and an algorithm for "Integrity Protection"; a second verification information generator unit configured to generate second verification information by extracting predetermined bits of the first verification information; and a verification unit configured to verify, by use of the second verification information, an RRC-PDU for RRC connection re-establishment request received from a mobile station through a common control channel.

In the fourth aspect, the first parameter can be "COUNT", "bearer ID" and "direction (DL/UL)".

In the fourth aspect, the radio base station can further include: a notification unit configured to notify, to an neighbor radio base station, the second verification information by use of a handover preparation signal.

In the fourth aspect, the first verification information generator unit can be configured to extract a physical cell ID and a C-RNTI from the RRC-PDU for RRC connection re-establishment request received from the mobile station, to generates a PDU containing the extracted physical cell ID and C-RNTI as well as a (notification) cell ID of a cell that has received the RRC-PDU, and to generate the first verification information for the PDU.

In the fourth aspect, the radio base station can be configured to verify the RRC-PDU for RRC connection re-establishment request, by determining whether or not the second verification information held after being received through the handover preparation signal from an neighbor radio base station corresponds to second verification information contained in the RRC-PDU for RRC connection re-establishment request.

Effect of the Invention

As described above, the present invention can provide a mobile communication method, a mobile station and a radio base station, which are capable of generating "short MAC-I" contained in an "RRC Connection Re-establishment Request".

EMBODIMENT MODE FOR CARRYING OUT THE INVENTION (Mobile Communication System According to the First Embodiment of the Present Invention)

With reference to FIGS. 1 to 6, a mobile communication system according to a first embodiment of the present invention will be described. The LTE system is applied to the mobile communication system according to this embodiment.

Figure 1:
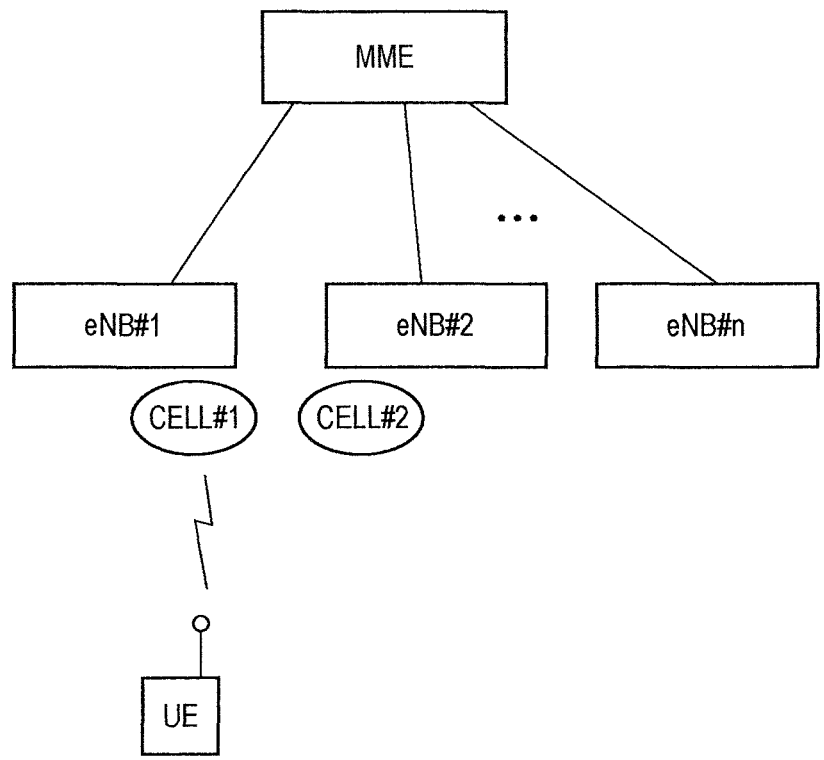
FIG. 1 is an overall configuration diagram of a mobile communication system according to a first embodiment of the present invention.

As shown in FIG. 1, the mobile communication system according to this embodiment includes an exchange MME and multiple radio base stations eNB#1 to eNB#n.

Figure 2:
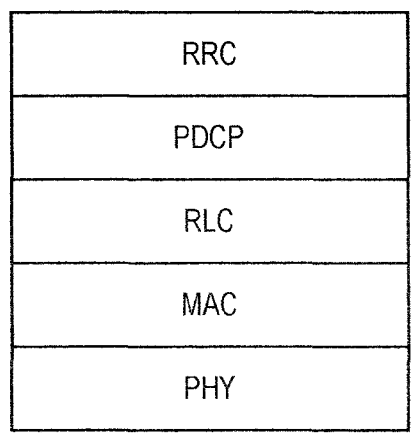
FIG. 2 is a diagram showing a protocol stack between a mobile station and a radio base station according to the first embodiment of the present invention.

FIG. 2 shows a protocol stack between a mobile station UE and the radio base station eNB according to this embodiment.

Specifically, each of the mobile station UE and the radio base station eNB according to this embodiment includes an RRC layer function, a PDCP layer function, an RLC layer function, a MAC layer function and a physical layer function.

Moreover, in the LTE type mobile communication system, three kinds of radio bearers for C-plane called "SRBs: Signalling Radio Bearers" (SRB0, SRB1 and SRB2) are specified.

The "SRB0" is a radio bearer for a common control channel (CCCH). In an uplink (UL), the "SRB0" is used for transmitting the "RRC Connection Establishment Request" and the "RRC Connection Re-establishment Request". In a downlink (DL), the "SRB0" is used for transmitting "RRC Connection Establishment", "RRC Connection Reject", "RRC Connection Re-establishment" and "RRC Connection Re-establishment Reject".

In general, "C-RNTI", "PCI" and "short MAC-I" are specified as information elements contained in the "RRC Connection Re-establishment Request".

Here, the "C-RNTI" includes 16 bits, and is specified as a "UE-ID" used by the mobile station UE in a serving cell until just before detection of an RLF. Moreover, the "PCI" includes 9 bits, and is specified as an ID of a serving cell connected to the mobile station UE until just before detection of an RLF. Furthermore, the "short MAC-I" is assumed to include 15 or 16 bits.

Specifically, the "SRB0" is used for transmitting a message in a situation where a sender and a receiver cannot be uniquely specified.

Moreover, since the "SRB0" is the radio bearer for the common control channel (CCCH), the "SRB0" has no PDCP layer. Therefore, neither an "Integrity Protection" function nor a "Ciphering" function can be applied to the "SRB0".

Furthermore, the "SRB1" is a radio bearer for a dedicated control channel (DCCH), and is used for transmitting all RRC messages (including NAS messages connected to the RRC messages) which are not transmitted by the "SRB0".

Note that the "Integrity Protection" function and the "Ciphering" function can be applied to the "SRB1".

Moreover, the "SRB2" is a radio bearer for a dedicated control channel (DCCH), and is applied to "NAS Direct Transfer".

The "SRB2" has lower priority than the "SRB1", and the "Integrity Protection" function and the "Ciphering" function can be applied to the "SRB2".

Moreover, in the LTE type mobile communication system, a radio bearer for U-plane called a "DRB: Data Radio Bearer" is specified.

The "DRB" is a radio bearer for a dedicated traffic channel (DTCH), and a necessary number of DRBs are provided depending on communication services. Note that, since the "DRB" has a PDCP layer, the "Ciphering" function can be applied to the "DRB" within the PDCP layer.

Figure 3:
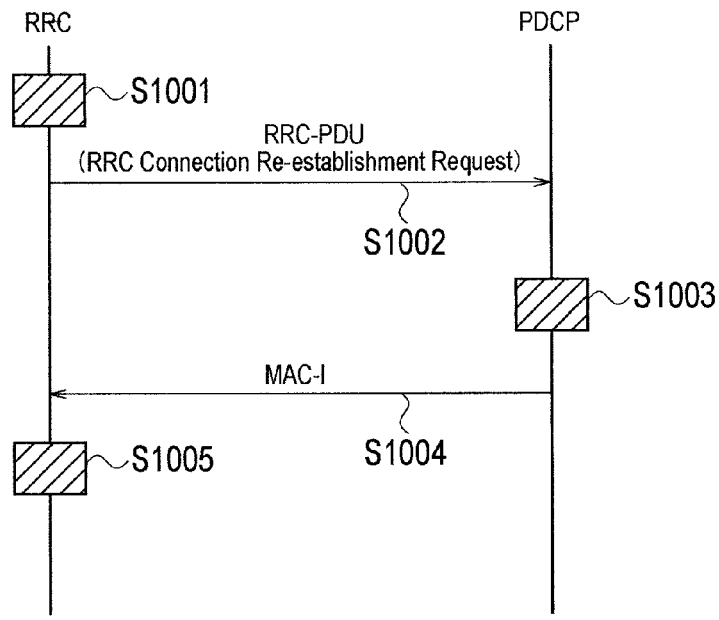
FIG. 3 is a sequence diagram showing an operation of generating "short MAC-I" in the mobile station according to the first embodiment of the present invention.

With reference to FIG. 3, a description will be given below of an operation of generating the "short MAC-I (second verification information)" in the mobile station UE and the radio base station eNB.

As shown in FIG. 3, in Step S1001, the RRC layer function generates an RRC-PDU for "RRC Connection Re-establishment Request" containing a predetermined "short MAC-I".

For example, the RRC layer function may set, as the predetermined "short MAC-I", a "short MAC-I" in which all bits have a value of "0".

Moreover, the RRC layer function is configured to set a "C-RNTI" and a "PCI", which are known to both the mobile station UE and the radio base station eNB, in the RRC-PDU for "RRC Connection Re-establishment Request".

For example, the RRC layer function may set values currently used by the mobile station UE as the "C-RNTI" and the "PCI" in the RRC-PDU for "RRC Connection Re-establishment Request".

Moreover, the RRC layer function may set a predetermined number of higher order or lower order bits in the "short MAC-I" to a "PCI" of a target cell and pad the rest with "0" in the RRC-PDU for "RRC Connection Re-establishment Request".

In the case of the mobile station UE, a "PCI" of a cell selected by cell selection after an RLF detection (i.e., a cell to which the mobile station UE actually transmits the "RRC Connection Re-establishment Request") can be set as the "PCI" of the target cell.

On the other hand, in the case of the radio base station eNB, a "PCI" of a cell which performs "HO preparation" (i.e., a cell which is likely to receive the "RRC Connection Re-establishment Request" from the mobile station UE) can be set as the "PCI" of the target cell.

In Step S1002, the RRC layer function transmits the generated RRC-PDU for "RRC Connection Re-establishment Request" to the PDCP layer function.

In Step S1003, the PDCP layer function generates "MAC-I (first verification information)" from the received RRC-PDU for "RRC Connection Re-establishment Request" by using a predetermined algorithm (e.g., an algorithm for "Integrity Protection" that is currently in use)

To be more specific, the PDCP layer function calculates the "MAC-I" by inputting a first key $K_{RRC\_IP}$ and three parameters "COUNT (32 bits)", "bearer ID (8 bits)" and "direction (DL/UL)" to the currently-used algorithm for "Integrity Protection".

Here, the first key $K_{RRC\_IP}$ is calculated by use of an incremented master key $K_{eNB}[n+1]$.

The master key $K_{eNB}$ is updated at the time of handover from the current master key $K_{eNB}[n]$ to the next master key $K_{eNB}[n+1]$ to be used after the handover. The incremented master key $K_{eNB}[n+1]$ to be used after the next handover can be used to calculate the first key $K_{RRC\_IP}$ used for calculation of the "short MAC-I".

Moreover, the PDCP layer function uses a "bearer ID" for the "SRB1" or the "SRB0" as the "bearer ID". Note that, since the "SRB0" is the radio bearer for the common control channel (CCCH), the "SRB0" normally has no "bearer ID". However, for the above purpose, the "bearer ID" is also specified for the "SRB0".

In terms of security, the PDCP layer function needs to avoid securing multiple RRC-PDUs by use of the same master key $K_{elm}$ and the same parameters (particularly, "COUNT"). In this regard, the PDCP layer function can use the "bearer ID" for the "SRB0" as the "bearer ID" to avoid complexity. When the PDCP layer function uses the "bearer ID" for the "SRB1" as the "bearer ID", there occurs a trouble such that "COUNT=0" cannot be used in the original RRC-PDU of the "SRB1".

In addition, the PDCP layer function sets the "COUNT" to "0". However, the PDCP layer function need not increment the "COUNT" by the "MAC-I" calculation operation.

The "COUNT" may be expressed by being divided into "HFN" representing higher order bits and "SN" representing lower order bits.

The PDCP layer function inserts only the "SN" portion into an actual header, and only manages the "HFN" portion.

Furthermore, the PDCP layer function sets the "direction" to "UL".

In Step S1004, the PDCP layer function transmits the generated "MAC-I" to the RRC layer function.

In Step S1005, the RRC layer function extracts predetermined bits (e.g., 16 LSBs, 16 MSBs or the like) of the received "MAC-I", and sets the bits as the "short MAC-I" in the RRC-PDU for "RRC Connection Re-establishment Request".

Next, with reference to FIGS. 4 to 6, a description will be given of a connection re-establishment procedure in the mobile communication system according to this embodiment.

Firstly, with reference to FIG. 4, a description will be given of an example where the connection re-establishment procedure is successfully performed.

Figure 4:
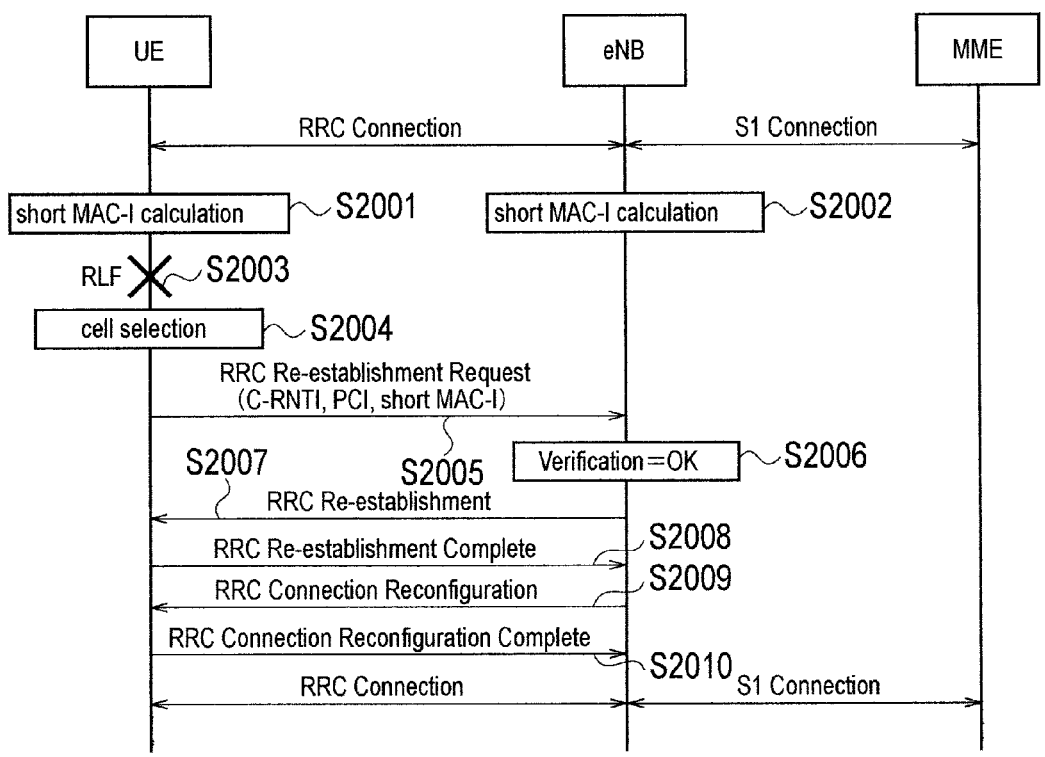
FIG. 4 is a sequence diagram showing a connection re-establishment procedure in the mobile communication system according to the first embodiment of the present invention.

As shown in FIG. 4, an RRC connection is established between the mobile station UE and the radio base station eNB and an S1 connection is established between the radio base station eNB and the exchange MME. Here, the mobile station UE and the radio base station eNB calculate "short MAC-I" by performing the operations shown in FIG. 3, in Steps S2001 and S2002.

The mobile station UE and the radio base station eNB may calculate the "short MAC-I" upon completion of a handover procedure, upon completion of a connection re-establishment procedure, upon detection of an RLF, or the like.

In Step S2003, the mobile station UE detects an RLF during the RRC connection described above. For example, the mobile station UE detects the RLF in any of the following cases.

When an RSRP (Reference Signal Received Power) in the RRC connection falls below a predetermined threshold for a predetermined period of time When a random access procedure is not successfully performed When the handover procedure fails Thereafter, the mobile station UE performs cell selection processing in Step S2004, and sends the selected cell (or to the radio base station eNB that manages the selected cell) the "RRC Connection Re-establishment Request" containing the "C-RNTI", "PCI" and "short MAC-I" through the common control channel.

The radio base station eNB manages a serving cell of the mobile station UE, and previously holds "UE context (short MAC-I)" of the mobile station UE. For this reason, in Step S2006, the radio base station eNB verifies the received "RRC Connection Re-establishment Request" by comparing the previously-held "short MAC-I" with the "short MAC-I" contained in the "RRC Connection Re-establishment Request".

In the example of FIG. 4, since the validity of the "RRC Connection Re-establishment Request" is successful, the radio base station eNB transmits "RRC Connection Re-establishment" to the mobile station UE in Step S2007.

In Step S2008, the mobile station UE transmits "RRC Connection Re-establishment Complete" to the radio base station eNB.

In Step S2009, the radio base station eNB transmits "RRC Connection Reconfiguration" to the mobile station UE. In Step S2010, the mobile station UE transmits "RRC Connection Reconfiguration Complete" to the radio base station eNB.

Secondly, with reference to FIG. 5, a description will be given of an example where the connection re-establishment procedure fails.

Figure 5:
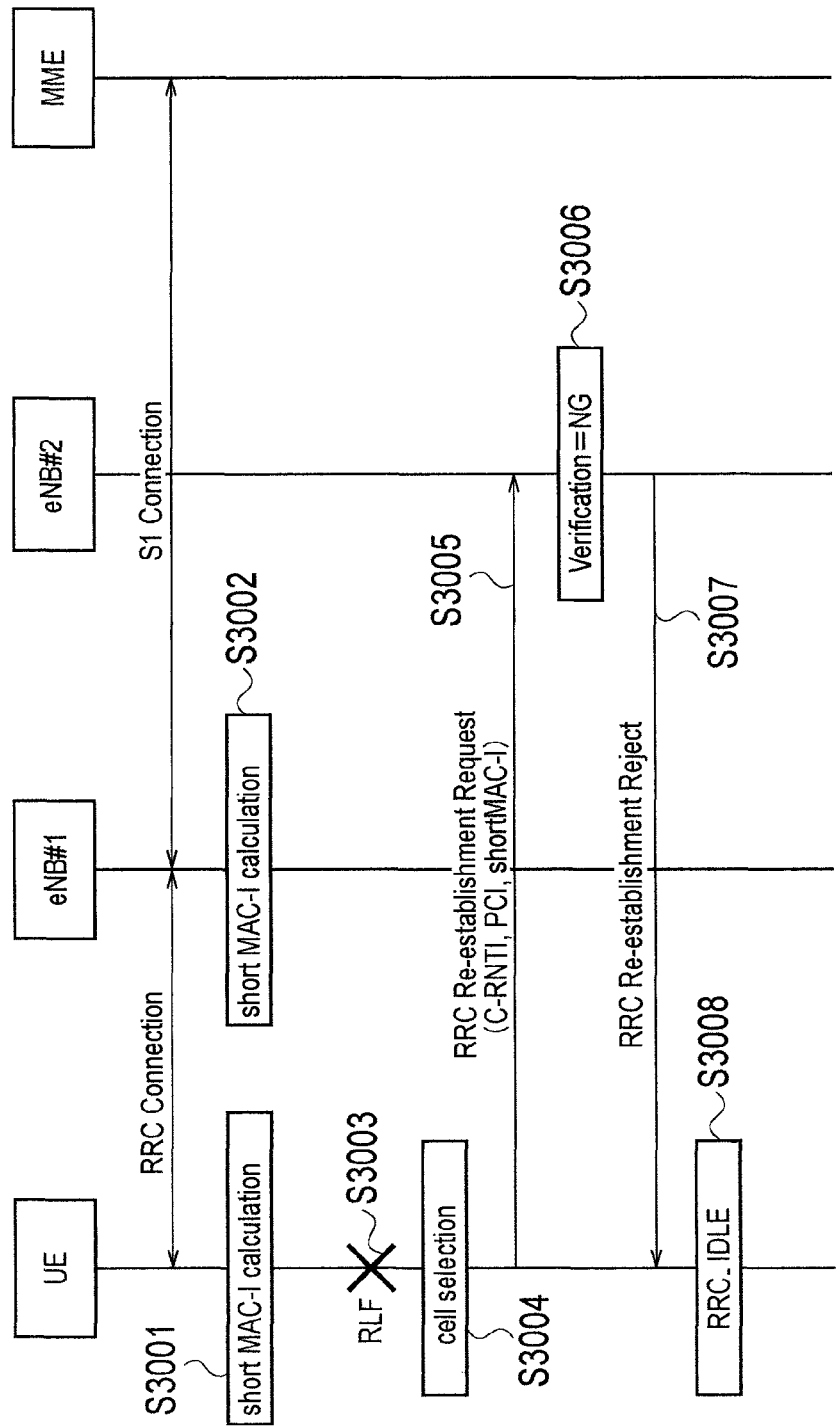
FIG. 5 is a sequence diagram showing a connection re-establishment procedure in the mobile communication system according to the first embodiment of the present invention.

As shown in FIG. 5, an RRC connection is established between the mobile station UE and the radio base station eNB#1 and an S1 connection is established between the radio base station eNB#1 and the exchange MME. Here, the mobile station UE and the radio base station eNB#1 calculate "short MAC-I" by performing the operations shown in FIG. 3, in Steps S3001 and S3002.

In Step S3003, the mobile station UE detects an RLF during the RRC connection described above.

Thereafter, the mobile station UE performs cell selection processing in Step S3004, and sends the selected cell (or the radio base station eNB#2 that manages the selected cell) the "RRC Connection Re-establishment Request" containing the "C-RNTI", "PCI" and "short MAC-I" through the common control channel.

The radio base station eNB#2 does not manage a serving cell of the mobile station UE, and does not previously hold "UE context (short MAC-I)" of the mobile station UE. For this reason, in Step S3006, the radio base station eNB#2 is unable to verify the "RRC Connection Re-establishment Request".

As a result, in Step S3007, the radio base station eNB#2 transmits "RRC Connection Re-establishment Reject" to the mobile station UE.

In Step S3008, the RRC connection between the mobile station UE and the radio base station eNB#1 is released, so that the mobile station UE transits to an idle state.

As described above, to succeed in the connection re-establishment procedure, the radio base station eNB that manages the cell selected by the mobile station UE needs to previously hold the "UE context" of the mobile station UE.

Here, if the cell selected by the mobile station UE is an original serving cell of the mobile station UE, the connection re-establishment procedure is successfully performed since the radio base station eNB previously holds the "UE context" of the mobile station UE (see FIG. 4).

On the other hand, in order to successfully carry out the connection re-establishment procedure even if the cell selected by the mobile station UE is not an original serving cell of the mobile station UE, the radio base station eNB that manages the cell needs to prepare the "UE context" of the mobile station UE in advance.

The "UE context" can be prepared by carrying out an "HO Preparation procedure".

In the handover procedure, a handover-source radio base station S-eNB can transfer the "UE context" of the mobile station UE to a handover-target radio base station T-eNB by the "HO Preparation".

Moreover, in case of an RLF detection, the handover-source radio base station S-eNB can transmit the "HO Preparation" containing the "UE context" of the mobile station UE to one or more neighbor radio base stations any time, even when the handover procedure is not intended.

Thirdly, with reference to FIG. 6, a description will be given of operations of the mobile communication system according to this embodiment in the case described above.

Figure 6:
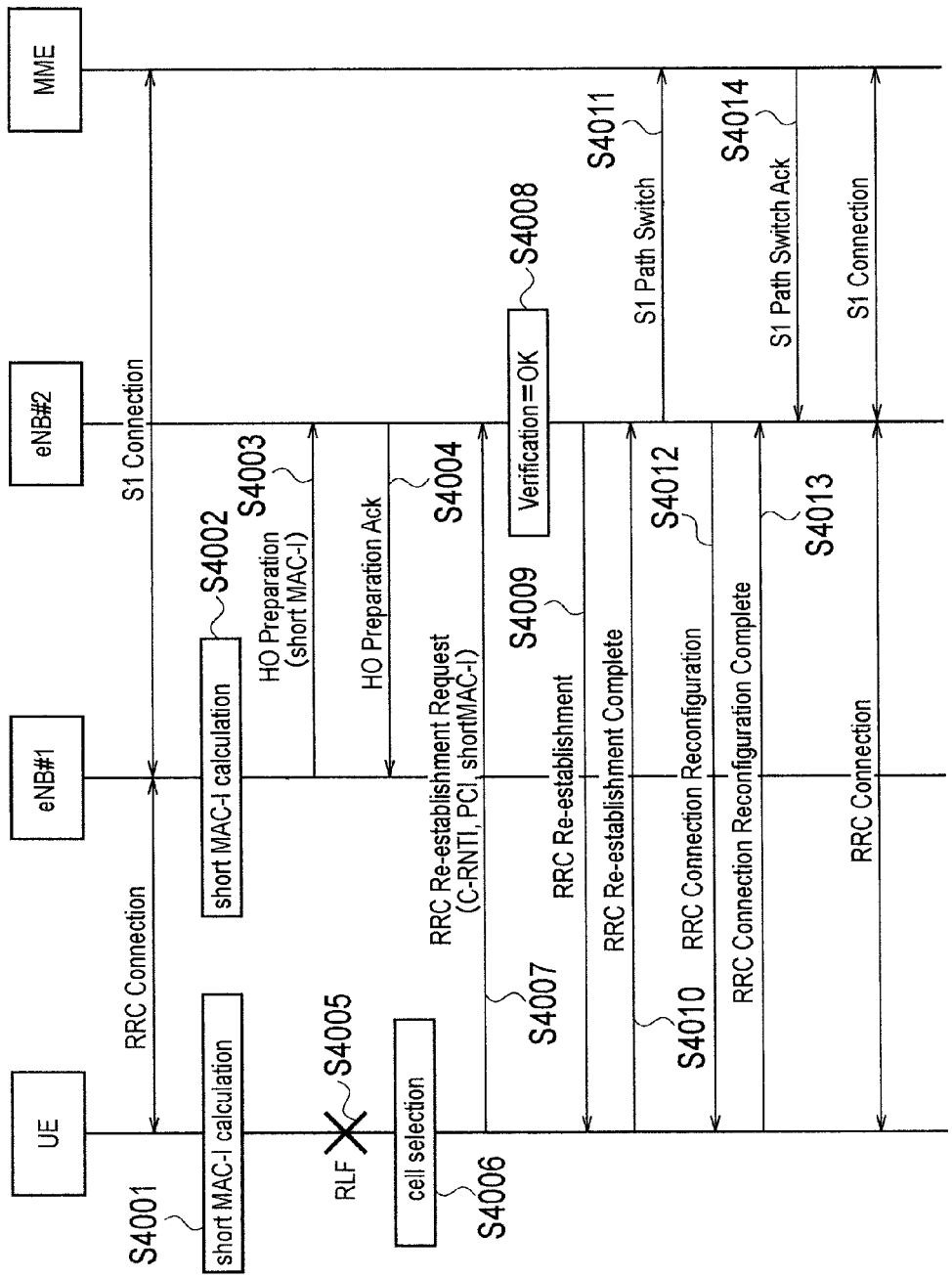
FIG. 6 is a sequence diagram showing a connection re-establishment procedure in the mobile communication system according to the first embodiment of the present invention.

As shown in FIG. 6, an RRC connection is established between the mobile station UE and the radio base station eNB#1 and an S1 connection is established between the radio base station eNB#1 and the exchange MME. Here, the mobile station UE and the radio base station eNB#1 calculate "short MAC-I" by performing the operations shown in FIG. 3, in Steps S4001 and S4002.

Here, in Step S4003, the radio base station eNB#1 transmits "HO Preparation" containing "UE context (short MAC-I)" of the mobile station UE to the neighbor radio base station eNB#2.

In Step S4004, after acquisition of the "UE context (short MAC-I)" of the mobile station UE, the radio base station eNB#2 transmits "HO Preparation Ack" showing that effect to the mobile station UE.

In Step S4005, the mobile station UE detects an RLF during the RRC connection described above.

Thereafter, the mobile station UE performs cell selection processing in Step S4006, and sends the selected cell (or the radio base station eNB#2 that manages the selected cell) the "RRC Connection Re-establishment Request" containing the "C-RNTI", "PCI" and "short MAC-I" through the common control channel.

The radio base station eNB#2 previously holds the "UE context (short MAC-I)" of the mobile station UE. For this reason, in Step S4008, the radio base station eNB#2 verifies the received "RRC Connection Re-establishment Request" by comparing the previously-held "short MAC-I" with the "short MAC-I" contained in the "RRC Connection Re-establishment Request".

In the example of FIG. 6, since the validity of the "RRC Connection Re-establishment Request" is successful, the radio base station eNB#2 transmits "RRC Connection Re-establishment" to the mobile station UE in Step S4009.

In Step S4010, the mobile station UE transmits "RRC Connection Re-establishment Complete" to the radio base station eNB#2.

The radio base station eNB#2 transmits "S1 Path Switch" to the exchange MME in Step S4011, and also transmits "RRC Connection Reconfiguration" to the mobile station UE in Step S4012.

In Step S4013, the mobile station UE transmits "RRC Connection Reconfiguration Complete" to the radio base station eNB#2. In Step S4014, the exchange MME transmits "S1 Path Switch Ack" to the radio base station eNB#2.

As a result, the connection re-establishment procedure described above is successfully performed, so that an RRC connection is established between the mobile station UE and the radio base station eNB#2, and an S1 connection is established between the radio base station eNB#2 and the exchange MME.

(Advantageous Effect of the Mobile Communication System According to the First Embodiment of the Present Invention)

The mobile communication system according to the first embodiment of the present invention enables calculation of the "short MAC-I" contained in the "RRC Connection Re-establishment Request" transmitted through the common control channel having no PDCP layer function.

Moreover, according to the mobile communication system according to the first embodiment of the present invention, the radio base station eNB that has received "short MAC-I" by the "HO Preparation" does not need to calculate the "short MAC-I". Therefore, the radio base station eNB can verify the "RRC Connection Re-establishment Request" by simply comparing the "short MAC-I" using the RRC layer function.

Furthermore, according to the mobile communication system according to the first embodiment of the present invention, the validity of the "RRC Connection Re-establishment Request" can be successful even when the algorithm for "Integrity Protection" to be used (in the LTE system, it is possible to select between two types, AES and Snow3G) varies between the handover-source radio base station S-eNB and the handover-target radio base station T-eNB during handover.

MODIFIED EXAMPLE

The radio base station eNB#1 may also be configured not to transmit "HO Preparation" that does not contain "short MAC-I". However, note that such "HO Preparation" contains "C-RNTI" and "PCI".

In such a case, firstly, the RRC layer function of the neighbor radio base station eNB#2 extracts the "C-RNTI" and "PCI" contained in the "RRC Connection Re-establishment Request" received from the mobile station UE, and temporarily creates an RRC-PDU for "RRC Connection Re-establishment Request" on the basis of the extracted "C-RNTI" and "PCI".

Here, the RRC layer function of the neighbor radio base station eNB#2 sets all values of the "short MAC-I" to "0" in the RRC-PDU for "RRC Connection Re-establishment Request".

Alternatively, the RRC layer function of the neighbor radio base station eNB#2 sets higher order or lower order bits in the "short MAC-I" to a "PCI" (a "PCI" under the radio base station eNB#2 that has received the "RRC Connection Re-establishment Request" from the mobile station UE) and sets the rest to "0" in the RRC-PDU for "RRC Connection Re-establishment Request".

Secondly, the RRC layer function of the neighbor radio base station eNB#2 transmits the generated RRC-PDU for "RRC Connection Re-establishment Request" to the PDCP layer function of the neighbor radio base station eNB#2.

Thirdly, the PDCP layer function of the neighbor radio base station eNB#2 calculates "MAC-I (which may also be called X-MAC due to "MAC-I" on the receiving side)". Here, the first key $K_{RRC\_IP}$, "COUNT", "bearer ID" and "direction" are handled in the same manner as the calculation operation in the mobile station UE.

Fourthly, the RRC layer function of the neighbor radio base station eNB#2 extracts 16 LSBs or 16 MSBs of the "MAC-I" received from the PDCP function (which is called "short X-MAC").

The RRC layer function of the neighbor radio base station eNB#2 checks if the "short X-MAC" corresponds to the "short MAC-I" contained in the "RRC Connection Re-establishment Request" received from the mobile station UE. Thus, the RRC layer function evaluates the credibility of the "RRC Connection Re-establishment Request".

Note that, if a "Prepare procedure" is not performed for the neighbor radio base station eNB#2, the neighbor radio base station eNB#2 does not have the first key $K_{RRCIP}$ since the neighbor radio base station eNB#2 does not previously hold "UE context". Therefore, the neighbor radio base station eNB#2 transmits "RRC Connection Re-establishment Reject" without calculating "short X-MAC".

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising the steps of:
    generating, at a mobile station and a serving radio base station serving the mobile station, first verification information by use of a first key, first parameters and an algorithm for "Integrity Protection," wherein the first parameters are "COUNT," "bearer ID," and "direction (DL(Downlink)/UL(Uplink))";
    generating, at the mobile station and at the serving radio base station, short MAC-I (Message Authentication Code for Integrity) information by extracting predetermined bits of the first verification information;
    transmitting, from the serving radio base station to a neighbor radio base station, the short MAC-I information by use of a handover preparation signal;
    performing, at the mobile station, cell selection processing, and transmitting, from the mobile station to a selected radio base station that manages the selected cell, an RRC-PDU (Radio Resource Control-Protocol Data Unit) for RRC connection re-establishment request through a common control channel, upon detection of a radio link failure in an RRC connection, the short MAC-I information being set in the RRC-PDU for RRC connection re-establishment request, wherein the selected base station is one of the serving base station and the neighbor base station; and verifying, at the selected radio base station, the RRC-PDU for RRC connection re-establishment request received from the mobile station by use of the short MAC-I information;

wherein a physical cell ID and a C-RNTI are set in the RRC-PDU for RRC connection re-establishment request.

2. A radio base station comprising:

a first verification information generator unit configured to generate first verification information by use of a first key, first parameters, and an algorithm for "Integrity Protection," wherein the first parameters are "COUNT," "bearer ID," and "direction (DL(Downlink)/UL(Uplink))";

a short MAC-I (Message Authentication Code for Integrity) information generator unit configured to generate short MAC-I information by extracting predetermined bits of the first verification information;

a verification unit configured to verify, by use of the short MAC-I information, an RRC-PDU (Radio Resource Control-Protocol Data Unit) for RRC connection re-establishment request received from a mobile station through a common control channel, wherein short MAC-I information, a physical cell ID, and a C-RNTI are set in the RRC-PDU for RRC connection re-establishment request; and a notification unit configured to notify, to a neighbor radio base station, the short MAC-I information by use of a handover preparation signal.

3. The radio base station according to claim 2, wherein the first verification information generator unit is configured to extract a physical cell ID and a C-RNTI from the RRC-PDU for RRC connection re-establishment request received from the mobile station, to generates a PDU containing the extracted physical cell ID and C-RNTI as well as a cell ID of a cell that has received the RRC-PDU, and to generate the first verification information for the PDU.

4. The radio base station according to claim 2, wherein the radio base station is configured to verify the RRC-PDU for RRC connection re-establishment request, by determining whether or not the short MAC-I information held after being received through the handover preparation signal from an neighbor radio base station corresponds to short MAC-I information contained in the RRC-PDU for RRC connection re-establishment request.

5. The radio base station according to claim 2, wherein the notification unit is configured to notify, to one or more neighbor radio base stations, the short MAC-I information by use of a handover preparation signal in case of a radio link failure detection, when the handover procedure is not intended.

* * * * *